(12) United States Patent
Matsuura (10) Patent No.: US 10,664,982 B2
(45) Date of Patent: May 26, 2020

(54) IMAGE PROCESSING APPARATUS, IMAGE PROCESSING SYSTEM AND NON-TRANSITORY COMPUTER-READABLE STORAGE MEDIUM

(71) Applicant: MITUTOYO CORPORATION, Kanagawa (JP)

(72) Inventor: Shinpei Matsuura, Ibaraki (JP)

(73) Assignee: MITUTOYO CORPORATION, Kanagawa (JP)

(*) Notice: Subject to any disclaimer, the term of this patent is extended or adjusted under 35 U.S.C. 154(b) by 23 days.

(21) Appl. No.: 16/116,089

(22) Filed: Aug. 29, 2018

(65) Prior Publication Data

US 2019/0073782 A1 Mar. 7, 2019

(30) Foreign Application Priority Data

Sep. 4, 2017 (JP) ................................. 2017-169845

(51) Int. Cl.
*G06T 7/521* (2017.01)
*H04N 9/31* (2006.01)
(Continued)

(52) U.S. Cl.
CPC ............ *G06T 7/521* (2017.01); *G06T 7/55* (2017.01); *G06T 7/60* (2013.01); *H04N 5/2256* (2013.01); *H04N 5/235* (2013.01); *H04N 5/2354* (2013.01); *H04N 5/23229* (2013.01); *H04N 9/3179* (2013.01); *H04N 9/3194* (2013.01); *G06T 2207/10028* (2013.01); *G06T 2207/10152* (2013.01); *G06T 2207/30168* (2013.01)

(58) Field of Classification Search
None
See application file for complete search history.

(56) References Cited

U.S. PATENT DOCUMENTS

2010/0103169 A1* 4/2010 Zhang .................... G01B 11/25
345/420
2016/0173842 A1* 6/2016 De La Cruz ......... G03B 21/147
353/70

OTHER PUBLICATIONS

Leong-Hoï, A., Montgomery, P.C., Serio, B. and Twardowski, P., 2015. High speed implementation of a three-dimensional shape profiler with submillimeter precision using a digital light processing device and a new efficient algorithm for absolute phase retrieval. Optical Engineering, 54(3), p. 034102. (Year: 2015).*

(Continued)

*Primary Examiner* — Clifford Hilaire
(74) *Attorney, Agent, or Firm* — Greenblum & Bernstein, P.L.C.

(57) ABSTRACT

An image processing apparatus includes an image acquisition part that acquires a plurality of different measured images, a modeling part that identifies, for each pixel, a modeled parameter approximating an approximation function of a data sequence where pixel values of pixels corresponding to the respective measured images are placed in an order of capturing, a reconstructed image generation part that generates reconstructed images which are images corresponding to the respective measured images and reconstructed with an approximation value of each pixel identified based on the modeled parameter of each pixel, and an image changing part that changes the pixel values of the measured images based on statistics of the pixel values of the measured images and that of the corresponding reconstructed images.

8 Claims, 6 Drawing Sheets

(51) Int. Cl.
*G06T 7/55* (2017.01)
*H04N 5/235* (2006.01)
*G06T 7/60* (2017.01)
*H04N 5/225* (2006.01)
*H04N 5/232* (2006.01)

(56) References Cited

OTHER PUBLICATIONS

Rosman G, Dubrovina A, Kimmel R. Sparse modeling of shape from structured light. In2012 Second International Conference on 3D Imaging, Modeling, Processing, Visualization & Transmission Oct. 13, 2012 (pp. 456-463). IEEE. (Year: 2012).*
Salvi J, Fernandez S, Pribanic T, Llado X. A state of the art in structured light patterns for surface profilometry. Pattern recognition. Aug. 1, 2010;43(8):2666-80. (Year: 2010).*
Tom Yoshizawa, "Saishin Hikari Sanjigen Sokutei, Fig. 4.26", 2006, pp. 47, submitted with a partial English-language translation.
U.S. Appl. No. 16/116,159 to Shinpei Matsuura, filed Aug. 29, 2018.

* cited by examiner

IMAGE PROCESSING APPARATUS, IMAGE PROCESSING SYSTEM AND NON-TRANSITORY COMPUTER-READABLE STORAGE MEDIUM

CROSS-REFERENCE TO RELATED APPLICATIONS

The present application claims priority to the Japanese Patent Application number 2017-169845, filed on Sep. 4, 2017. The content of this application is incorporated herein by reference in their entirety.

TECHNICAL FIELD

The present invention relates to an image processing apparatus, an image processing system, and a storage medium for measuring a geometry of an object to be measured.

BACKGROUND OF THE INVENTION

As a technique of measuring a three-dimensional geometry of an object to be measured, a three-dimensional (3D) geometry measuring machine that measures the geometry of the object to be measured by capturing the object to be measured onto which light with a plurality of projection patterns is projected is known (refer to Non-Patent Document, "Saishin Hikari Sanjigen Sokutei" FIG. 4.26, page 47, by Toni Yoshizawa, 2006).

A measured image, acquired by the three-dimensional (3D) geometry measuring machine capturing the object to be measured, may be affected by a surrounding environment such as fluctuations of the amount of light in the surroundings of the object to be measured, fluctuations of luminance of the light projected onto the object to be measured, or the like.

There has been a concern that measurement accuracy at the time of measuring the object to be measured may be negatively influenced if the measured image is affected by the surrounding environment.

This invention focuses on this point, and an object of the invention is to provide a technique for reducing the influence of the surrounding environment on the measured image.

BRIEF SUMMARY OF THE INVENTION

An image processing apparatus according to the first aspect of the present invention includes: an image acquisition part that acquires a plurality of different measured images acquired by capturing an object to be measured onto which light with different projection patterns whose luminance changes according to phases determined by coordinates of a projection image and whose relationships between the phase and the coordinate are different from each other is sequentially projected; a modeling part that identifies, for each pixel, a modeled parameter approximating an approximation function of a data sequence where pixel values of pixels corresponding to the respective measured images are placed in an order of the capturing; a reconstructed image generation part that generates reconstructed images which are images corresponding to the respective measured images and are reconstructed with approximation values of respective pixels identified based on the modeled parameter of each pixel; and an image changing part that changes the pixel values of the measured images based on statistics of the pixel values of the measured images and statistics of the pixel values of the corresponding reconstructed images.

A storage medium according to the second aspect of the present invention is a non-transitory computer-readable storage medium and stores a program that makes a computer perform functions of: acquiring a plurality of different measured images acquired by capturing an object to be measured onto which light with different projection patterns whose luminance changes according to the phases determined by coordinates of a projection image and whose relationships between the phase and the coordinate are different from each other is sequentially projected; identifying, for each pixel, a modeled parameter approximating an approximation function of a data sequence where pixel values of pixels corresponding to the respective measured images are placed in an order of the capturing; generating reconstructed images which are images corresponding to the respective measured images and reconstructed with an approximation value of each pixel identified based on the modeled parameter of each pixel; and changing the pixel values of the measured images based on statistics of the pixel values of the measured images and statistics of the pixel values of the corresponding reconstructed images.

An image processing system according to the third aspect of the present invention includes a projection apparatus that sequentially projects, onto an object to be measured, light with different projection patterns whose luminance changes according to the phases determined by coordinates of a projection image and whose relationships between the phase and the coordinate are different from each other; a capturing apparatus that generates a plurality of different measured images acquired by capturing the object to be measured onto which the light with the plurality of different projection patterns is respectively projected; and an image processing apparatus that changes pixel values of the respective measured images, wherein the image processing apparatus includes an image acquisition part that acquires a plurality of different measured images acquired by capturing an object to be measured onto which light with different projection patterns whose luminance changes according to phases determined by coordinates of a projection image and whose relationships between the phase and the coordinate are different from each other is sequentially projected; a modeling part that identifies, for each pixel, a modeled parameter approximating an approximation function of a data sequence where pixel values of pixels corresponding to the respective measured images are placed in an order of the capturing; a reconstructed image generation part that generates reconstructed images which are images corresponding to the respective measured images and are reconstructed with approximation values of respective pixels identified based on the modeled parameter of each pixel; and an image changing part that changes the pixel values of the measured images based on statistics of the pixel values of the measured images and statistics of the pixel values of the corresponding reconstructed images.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

Embodiment

Figure 1:
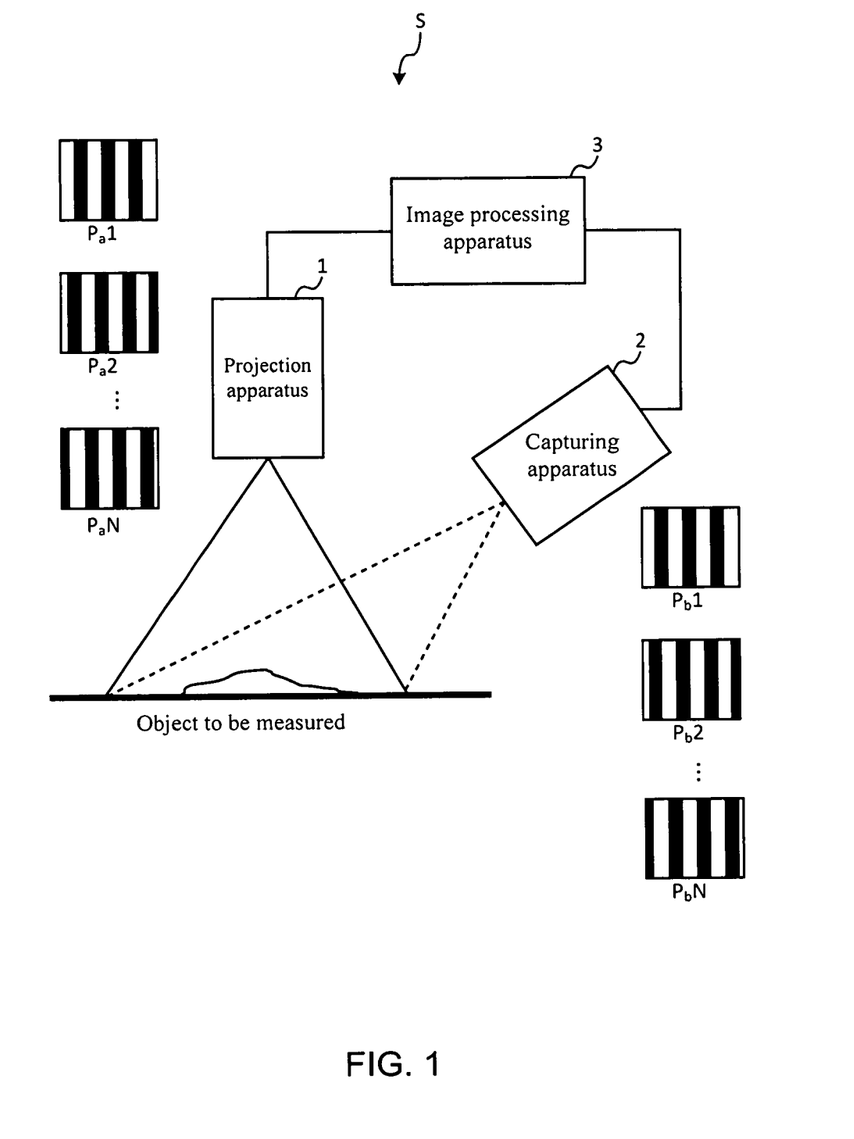
FIG. 1 illustrates the outline of an image processing system according to the embodiment.

The outline of an image processing system S according to the embodiment will be explained by referring to FIG. 1. FIG. 1 illustrates the outline of an image processing system S according to the embodiment. The image processing system according to the embodiment is an image processing system for measuring a geometry of an object to be measured by capturing the object to be measured onto which a projection image is projected.

The image processing system S includes a projection apparatus 1, a capturing apparatus 2, and an image processing apparatus 3. The image processing apparatus 3 is connected to the projection apparatus 1 and to the capturing apparatus 2 in a manner enabling communication. The projection apparatus 1 is a liquid crystal projector, for example. The projection apparatus 1 projects light with a plurality of different projection patterns ($P_a1, P_a2, \ldots, P_aN$) onto the object to be measured. The projection apparatus 1 sequentially projects, for example, light with sinusoidal patterns a plurality of times while changing the phase of the sinusoidal patterns.

The capturing apparatus 2 is, for example, a digital camera having an imaging element of two million pixels. The capturing apparatus 2 generates a plurality of different measured images ($P_b1, P_b2, \ldots, P_bN$) by sequentially capturing the object to be measured onto which light with the plurality of different projection patterns ($P_a1, P_a2, \ldots, P_aN$) is projected. The capturing apparatus 2 transmits the captured measured images to the image processing apparatus 3.

The measured images captured by the capturing apparatus 2 may be affected by fluctuations of the amount of light in an environment where measuring of the object to be measured takes place, fluctuations of the luminance of projected light projected by the projection apparatus 1, or the like. In such a case, the image processing apparatus 3 reduces the influence of the surrounding environment by performing image processing on a plurality of measured images.

The image processing apparatus 3 is a computer, for example. The image processing apparatus 3 acquires the measured images by controlling the projection apparatus 1 to sequentially project light with the plurality of projection patterns and controlling the capturing apparatus 2 to generate the measured images in a sequential manner by capturing the object to be measured onto which the projection image is projected. Then, the image processing apparatus 3 reduces the influence of the surrounding environment by performing the image processing on the plurality of acquired measured images.

Figure 2:
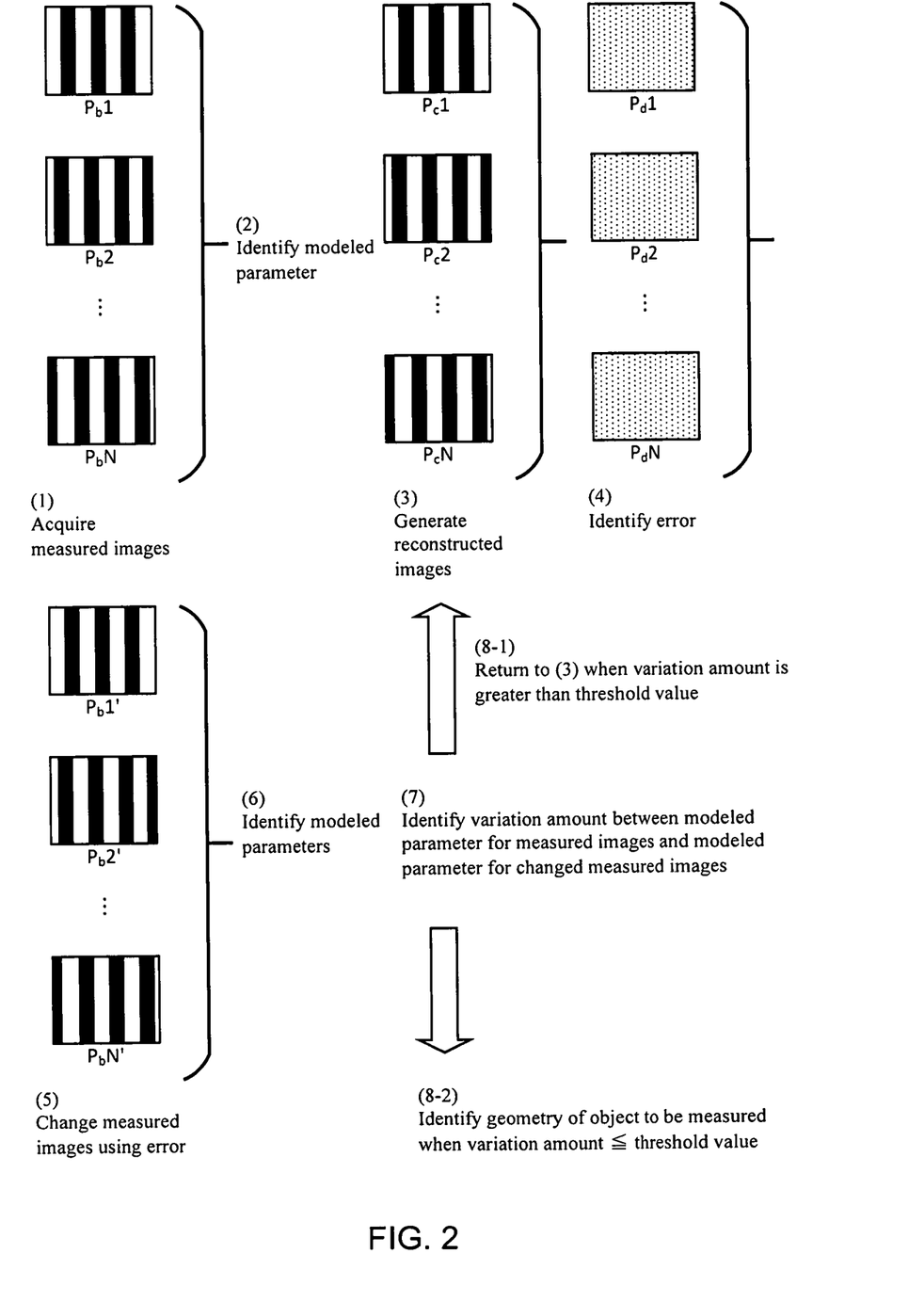
FIG. 2 illustrates the outline of processing for reducing the influence of the surrounding environment on a measured image.

The outline of processing for reducing the influence of surrounding environment that the image processing apparatus 3 performs on the measured image will be explained by referring to FIG. 2. FIG. 2 illustrates the outline of processing for reducing the influence of the surrounding environment on the measured image. First, the image processing apparatus 3 acquires a plurality of measured images ((1) of FIG. 2). The image processing apparatus 3 identifies a modeled parameter of an approximation function approximating pixel values of each pixel of the acquired measured images ((2) of FIG. 2). Hereafter, modeled parameters of approximation functions approximating pixel values of pixels of the acquired measured images may be called "modeled parameters for the measured image". The image processing apparatus 3 generates a plurality of reconstructed images ($P_c1, P_c2, \ldots, P_cN$) using an approximate value of each pixel identified based on the modeled parameter ((3) of FIG. 2).

The image processing apparatus 3 identifies an error of each pixel of the measured images ($P_d1, P_d2, \ldots, P_dN$) using the acquired measured images and the generated reconstructed images ((4) of FIG. 2). The image processing apparatus 3 generates a plurality of measured images having the changed pixel values ($P_b1', P_b2', \ldots, P_bN'$) by changing the pixel value of each pixel of the measured images using the identified error ((5) of FIG. 2). The image processing apparatus 3 identifies modeled parameters for the measured images having the changed pixel values ((6) of FIG. 2).

The image processing apparatus 3 identifies a variation amount between the modeled parameter for the acquired measured images and the modeled parameter for the measured images having the changed pixel values ((7) of FIG. 2). Then, the image processing apparatus 3 determines whether the identified variation amount is equal to or less than a variation threshold value. Here, the variation threshold value is an influence threshold value that corresponds to a convergence level acceptable for the image processing apparatus 3 to identify the geometry of the object to be measured. The influence threshold value may be determined in advance by an experiment while considering the amount of light of the projection apparatus 1, efficiency of the capturing apparatus 2, accuracy needed to measure the geometry of the object to be measured, or the like.

Upon determining that the identified variation amount is larger than the variation threshold value, the image processing apparatus 3 generates the reconstructed images based on the modeled parameters for the measured images having the changed pixel values ((8-1) of FIG. 2). The image processing apparatus 3 identifies the error of each pixel of the respective measured images having the changed pixel values using (i) the measured images having the changed pixel values and (ii) the reconstructed images that are newly generated. The image processing apparatus 3 newly generates a plurality of measured images whose pixel values are newly changed ($P_b1'', P_b2'', \ldots, P_bN''$) by changing once again the pixel value of each pixel of the respective measured images having the changed pixel values, using the identified error. The image processing apparatus 3 identifies a variation amount between the modeled parameters for the measured images having the changed pixel values ($P_b1', P_b2', \ldots, P_bN'$) and modeled parameters for the measured images having the newly changed pixel values ($P_b1'', P_b2'', \ldots, P_bN''$).

Upon determining that the variation amount is larger than the variation threshold value, the image processing apparatus 3 changes the pixel value of each pixel of the respective measured images. In this way, the image processing apparatus 3 can reduce the influence of the surrounding environment on the plurality of measured images. Also, upon determining that the variation amount corresponding to all the pixels of the measured images became equal to or less than the variation threshold value, for example, the image processing apparatus 3 stops changing pixel values and identifies the geometry of the object to be measured using the measured images whose pixel values were changed last ((8-2) of FIG. 2). Since the image processing apparatus 3 is capable of identifying the geometry of the object to be measured by using the plurality of measured images in which the influence of surrounding environment is reduced, the image processing apparatus 3 can improve measurement accuracy. It should be noted that the image processing apparatus 3 may stop changing the pixel values if the image processing apparatus 3 determines that the variation amounts corresponding to a number of pixels larger than a predetermined number are equal to or less than the variation threshold value.

<Configurations of the Image Processing Apparatus 3 According to the Embodiment>

Figure 3:
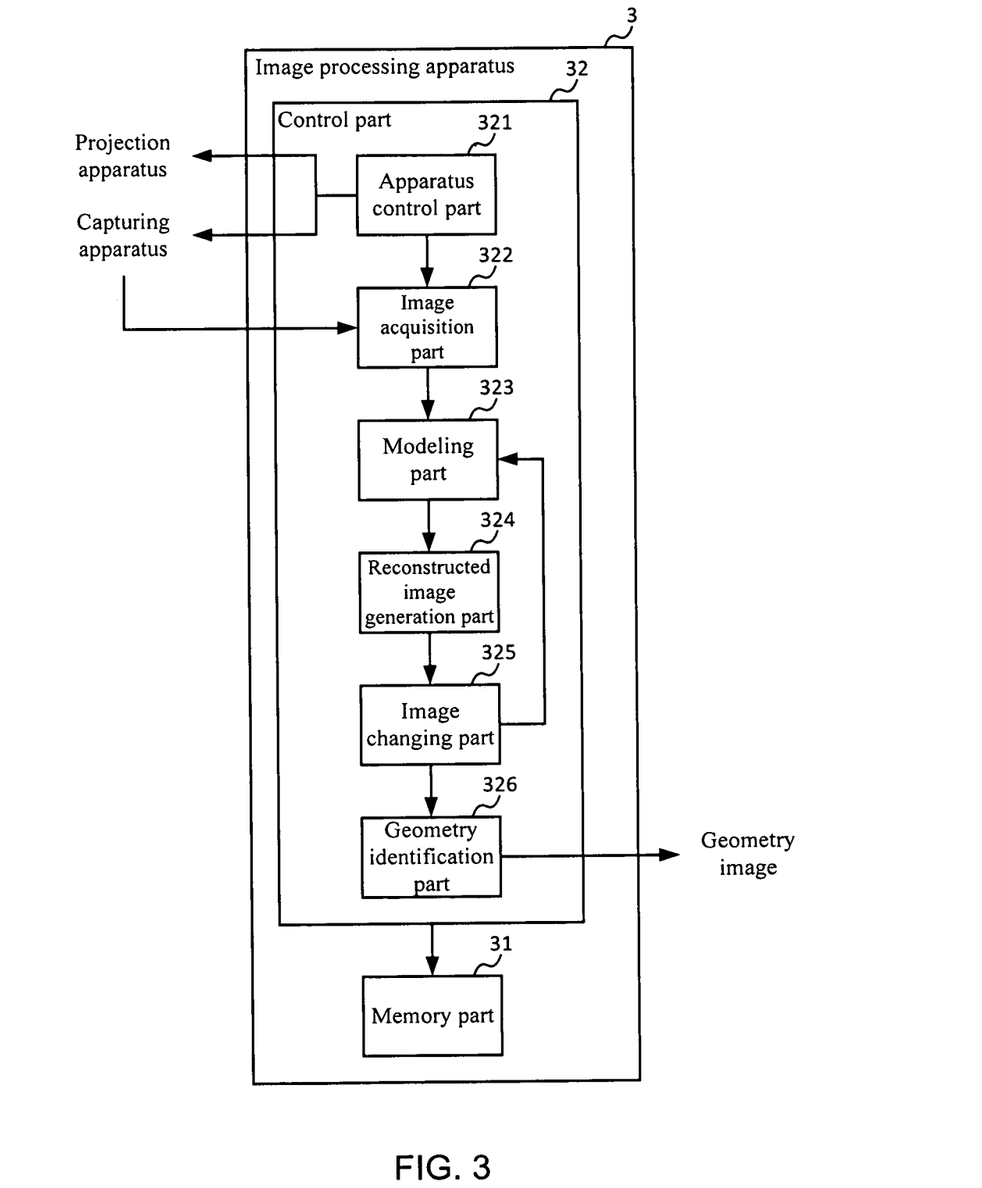
FIG. 3 shows a functional configuration of an image processing apparatus according to the embodiment.

A functional configuration of the image processing apparatus 3 according to the embodiment will be described by referring to FIG. 3. FIG. 3 shows the functional configuration of the image processing apparatus 3 according to the embodiment. The image processing apparatus 3 according to the embodiment includes a memory part 31 and a control part 32.

The memory part 31 includes a memory medium including a read only memory (ROM), a random access memory (RAM), and the like. The memory part 31 stores the plurality of measured images, the modeled parameters, the plurality of reconstructed images, the error of each pixel of the respective measured images, or the measured images having the pixel value changed. Also, the memory part 31 is a non-transitory computer-readable storage medium and stores programs to be executed by the control part 32. The memory part 31 may include a storage medium such as a CD-ROM which stores a program.

The control part 32 is a calculating resource including processors such as a central processing unit (CPU), not shown. By executing the programs stored in the memory part 31, the control part 32 realizes functions of an apparatus control part 321, an image acquisition part 322, a modeling part 323, a reconstructed image generation part 324, an image changing part 325, and a geometry identification part 326. The apparatus control part 321 controls the projection apparatus 1 and the capturing apparatus 2 by transmitting instruction information.

The apparatus control part 321 controls the projection apparatus 1 so as to project the projection light onto the object to be measured. Specifically, the apparatus control part 321 controls the projection apparatus 1 so as to sequentially project, onto the object to be measured, light with a plurality of projection patterns whose luminance changes according to the phases determined by coordinates of a projection image and whose relationship between the phase and the coordinate is different from each other. The apparatus control part 321 controls the projection apparatus 1 so as to sequentially project, for example, the light with projection patterns generated by the projection image having sinusoidal patterns while changing the phases of the sinusoidal patterns. The phase differences between sequentially projected projection patterns are, for example, constant.

The apparatus control part 321 may control the projection apparatus 1 so as to project N projection images onto the object to be measured in a sequential manner by changing the phases of the sinusoidal patterns N times. For example, when changing the phases of sinusoidal patterns N times, the apparatus control part 321 controls the projection apparatus 1 so as to change the phases of sinusoidal patterns by $\delta_i = 2\pi i/N (i=1, 2, \ldots, N)$. When projecting the sinusoidal patterns, the apparatus control part 321 performs control so as to project the projection image having the sinusoidal patterns that corresponds to $I(x,y)=I_0 \sin(2\pi x T/M_x + \delta_i)$ onto the object to be measured, where $I(x,y)$ denotes light intensity at the coordinates $(x,y)$ of the projection image. It should be noted that $M_x$ denotes the number of pixels in the x direction of the projection image, and T denotes the number of sinusoidal patterns included in the projection image.

The apparatus control part 321 controls the capturing apparatus 2 so as to generate the measured image by capturing the object to be measured onto which the projection light is projected. Specifically, the apparatus control part 321 controls the capturing apparatus 2 so as to generate a plurality of different measured images by sequentially capturing the object to be measured onto which light with a plurality of projection patterns is respectively projected. The apparatus control part 321 controls the capturing apparatus 2 so as to transmit the plurality of different measured images to the image acquisition part 322. The apparatus control part 321 may control the capturing apparatus 2 so as to transmit, to the image acquisition part 322, the different measured images, to which identifiers identifying the capturing order of the measured images are added.

The image acquisition part 322 acquires a plurality of different measured images. For example, the image acquisition part 322 acquires the different measured images acquired by capturing the object to be measured onto which light with projection patterns, whose luminance changes according to phases determined by coordinates of the projection image, is projected. Specifically, the image acquisition part 322 acquires the different measured images that are acquired by sequentially capturing the object to be measured onto which light with a projection pattern obtained by adding the plurality of different phase differences to the phases determined by the coordinates is projected. The image acquisition part 322 gives the different measured images being acquired to the modeling part 323.

The modeling part 323 identifies, for each pixel, a modeled parameter of the approximation function approximating the data sequence, in which the pixel values of the pixels corresponding to the measured images are placed in the order of capturing. Also, the modeling part 323 may identify modeled parameters based on the measured images whose pixel values are changed by the image changing part 325.

Figure 4A:
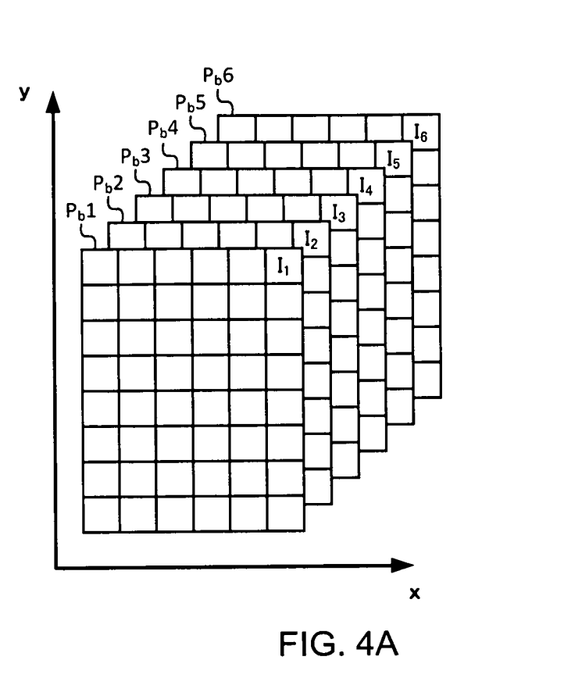
FIGS. 4A and 4B each illustrate an approximation function approximating a data sequence.
Figure 4B:
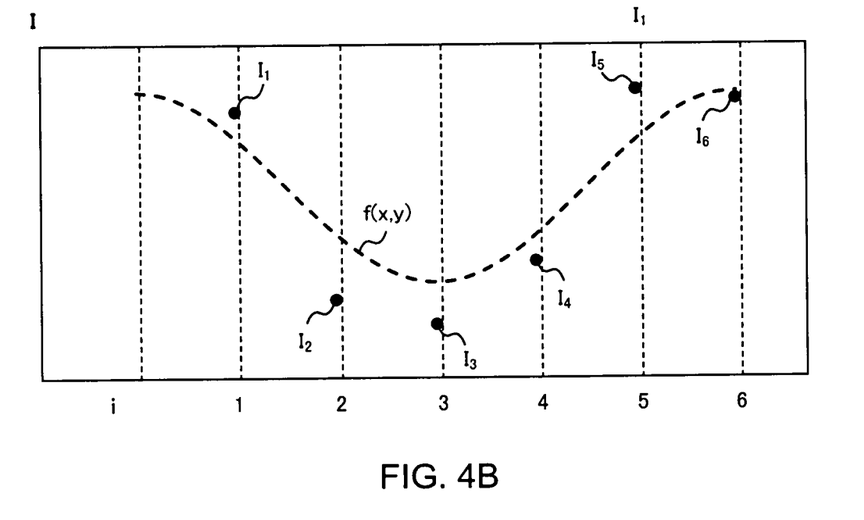

A method of the modeling part 323 identifying the modeled parameter of the approximation function approximating a data sequence will be described by referring to FIGS. 4A and 4B. FIGS. 4A and 4B each illustrate an approximation function approximating a data sequence. FIG. 4A is a schematic diagram showing the measured images placed in the order of capturing. In FIG. 4A, the horizontal axis and the vertical axis respectively indicate the x-coordinate and the y-coordinate of the measured image. The explanation below is given on the assumption that the image acquisition part 322 captured six measured images ($P_b1$, $P_b2$, $P_b3$, $P_b4$, $P_b5$, and $P_b6$). $I_i$ in FIG. 4A indicates the pixel value of the pixel determined by the x coordinate and the y coordinate of the i-th measured image.

FIG. 4B is a schematic diagram in which the data sequences, where the pixel values $I_i$ of the pixels determined by the coordinates (x,y) are placed in the order of capturing, are plotted. In FIG. 4A, the horizontal axis indicates the capturing order of the measured images, and the vertical axis indicates the pixel value of the pixel. The pixel value $I_i(x,y)$ of pixels determined based on the coordinates (x,y) of the i-th measured image are plotted with black circles. The function f(x,y) indicated in the broken line is the approximation function approximating the plotted data sequence.

Each piece of data of the plotted data sequence includes an error at the time of measuring. Therefore, the value of each piece of data and the approximate value, which is approximately identified based on the approximation function corresponding the data sequence, do not necessarily coincide with each other. The approximation function may be fit to the plotted data sequence by identifying the modeled parameter in which the sum of squares of an error $\varepsilon_i(x,y)$ becomes minimum, where a difference between each piece of data and the approximation value corresponding to each piece of data is set to the error at the time of measuring $\varepsilon_i(x,y)$.

Figure 5:
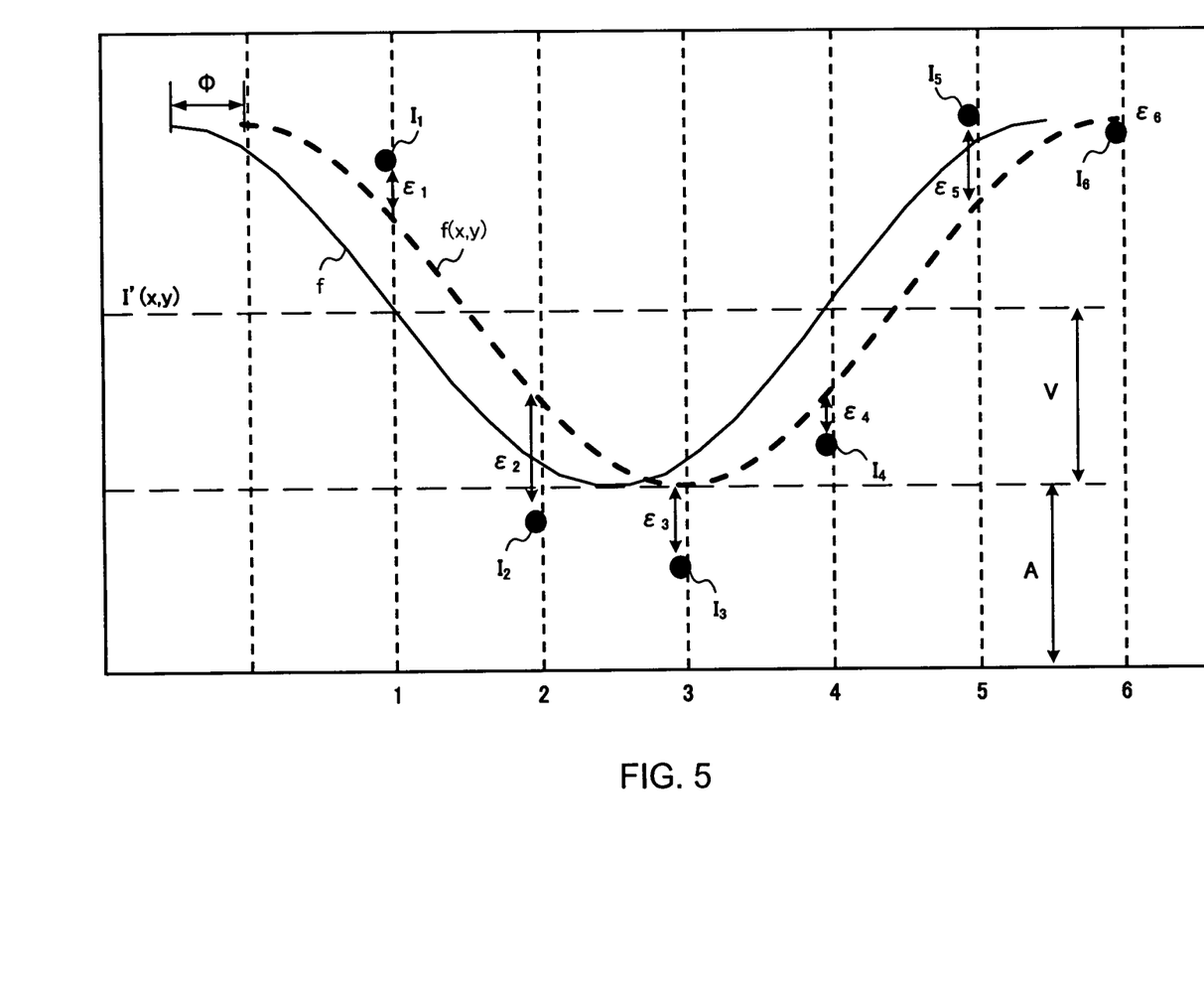
FIG. 5 illustrates processing for identifying a modeled parameter of the approximation function approximating a data sequence.

Processing for identifying a modeled parameter by the modeling part 323 will be described by referring to FIG. 5. FIG. 5 illustrates the process for identifying the modeled parameter of an approximation function approximating a data sequence. Similar to FIG. 4B, FIG. 5 is a schematic diagram in which the data sequences where the pixel values of the pixels are placed in the order of capturing are plotted. In FIG. 5, the function f indicated by the solid line is a reference approximation function. An amplitude V indicates an amplitude of the approximation function, a bias I'(x,y) indicates the center of the amplitude V, and an offset A indicates an offset of the approximation function. The function f(x,y) indicated by the broken line is the approximation function of the data sequence where the pixel values of the pixels of the coordinates (x,y) corresponding to the respective measured images are placed in the order of capturing and deviates from the reference approximation function by the phase φ, the amplitude ΔV, and the offset ΔA. Also, errors $\varepsilon_i$(i=1 to 6) respectively indicate a distance from each piece of data to the approximation value corresponding to each piece of data.

The approximation function is represented by Equation (1).

$$I_i(x,y) = I'(x,y) + V(x,y)\cos[\phi(x,y) + k(x,y) + \delta_i] \quad (1)$$

Here, the phase φ(x,y) is a variable indicating the phase shift of the approximation function of the data sequence where the pixel values of the pixels at the coordinates (x,y) are arranged, and is also a variable corresponding to a height of the object to be measured. In Equation (1), I'(x,y) denotes a bias I'(x,y), and V(x,y) denotes the amplitude of the approximation function. $\delta_i$ denotes the amount of phase change that is given to the i-th measured image. $\delta_i$ is, as shown above, $\delta_i = 2\pi i/N$ (i=1, 2, ..., N), and N=6 in the present embodiment. The phase k(x,y) is a variable associated with the phase of the sinusoidal patterns included in the projection pattern. In the explanation below, a sum of the phase φ(x,y) and the phase k(x,y) may be referred to as a phase value. Also, Equation (1) is transformed to be represented by Equation (2).

$$I_i(x, y) = I'(x, y) + V(x, y)\cos[\phi(x, y) + k(x, y)]\cos(\delta_i) - V(x, y)\sin[\phi(x, y) + k(x, y)]\sin(\delta_i) \quad (2)$$

Here, each item of Equation (2) is replaced as shown in Equations (3) to (5).

$$a_0(x,y) = I'(x,y) \quad (3)$$

$$a_1(x,y) = V(x,y)\cos[\phi(x,y) + k(x,y)] \quad (4)$$

$$a_2(x,y) = -V(x,y)\sin[\phi(x,y) + k(x,y)] \quad (5)$$

Equation (2) is represented by Equation (6) using Equations (3) to (5).

$$I_i(x,y) = a_0(x,y) + a_1(x,y)\cos(\delta_i) + a_2(x,y)\sin(\delta_i) \quad (6)$$

The pixel value of the coordinates (x,y) is represented by Equation (7) by expressing Equation (6) for the respective measured images.

$$I_1(x,y) = a_0(x,y) + a_1(x,y)\cos(\delta_1) + a_2(x,y)\sin(\delta_1)$$

$$I_2(x,y) = a_0(x,y) + a_1(x,y)\cos(\delta_2) + a_2(x,y)\sin(\delta_2)$$

$$I_N(x,y) = a_0(x,y) + a_1(x,y)\cos(\delta_N) + a_2(x,y)\sin(\delta_N) \quad (7)$$

Equation (7) is represented by Equation (8) using a matrix.

$$\begin{bmatrix} I_1 \\ I_2 \\ \vdots \\ I_N \end{bmatrix} = \begin{bmatrix} 1 & \cos(\delta_1) & \sin(\delta_1) \\ 1 & \cos(\delta_2) & \sin(\delta_2) \\ \vdots & \vdots & \vdots \\ 1 & \cos(\delta_N) & \sin(\delta_N) \end{bmatrix} \begin{bmatrix} a_0 \\ a_1 \\ a_2 \end{bmatrix} \quad (8)$$

Suppose that Equation (8) is I=Xa. In such a case, the vector 'a', which is optimal with regard to minimizing 2-norm of I-Xa, is known as a solution of the least-squares method, and can be expressed as $a = (X^T X)^{-1} X^T I$. Therefore, $X^T X$ is represented by Equation (9). Also, $X^T I$ is represented by Equation (10). In the following equation, unless otherwise specified, Σ without any subscription is the total sum of i=1 to N.

$$X^T X = \begin{bmatrix} N & \sum\cos(\delta_i) & \sum\sin(\delta_i) \\ \sum\cos(\delta_i) & \sum\cos^2(\delta_i) & \sum\cos(\delta_i)\sin(\delta_i) \\ \sum\sin(\delta_i) & \sum\cos(\delta_i)\sin(\delta_i) & \sum\sin^2(\delta_i) \end{bmatrix} \quad (9)$$

$$X^T I(x, y, \delta_i) = \begin{bmatrix} \sum I_i \\ \sum I_i\cos(\delta_i) \\ \sum I_i\sin(\delta_i) \end{bmatrix} \quad (10)$$

When $\delta_i = 2\pi i/N$ (i=1, 2, ..., N), the non-diagonal matrix in Equation (9) is zero, thus the vector 'a' is represented by Equation (11).

$$\begin{bmatrix} a_0 \\ a_1 \\ a_2 \end{bmatrix} = \begin{bmatrix} N & 0 & 0 \\ 0 & N/2 & 0 \\ 0 & 0 & N/2 \end{bmatrix}^{-1} \begin{bmatrix} \sum I_i \\ \sum I_i\cos(\delta_i) \\ \sum I_i\sin(\delta_i) \end{bmatrix} \quad (11)$$

Thus, $a_0$, $a_1$, and $a_2$ are respectively represented by Equations (12), (13), and (14).

$$a_0 = \frac{1}{N}\sum I_i \tag{12}$$

$$a_1 = \frac{2}{N}\sum I_i \cos(\delta_i) \tag{13}$$

$$a_2 = \frac{2}{N}\sum I_i \sin(\delta_i) \tag{14}$$

Using Equations (12) to (14), the modeling part 323 identifies the phase value of the pixel (the sum of the phase φ(x,y) and the phase k(x,y)), the amplitude V of the approximation function, and the offset A, which are the modeled parameters. The pixel value of the image is represented by Equation (15), the amplitude V of the approximation function is represented by Equation (16), and the offset A is represented by Equation (17). The modeling part 323 gives the identified modeled parameters to the reconstructed image generation part 324.

$$\phi(x,y) + k(x,y) = \arctan\left(\frac{-\sum_{i=1}^{N} I_i \sin(\delta_i)}{\sum_{i=1}^{N} I_i \cos(\delta_i)}\right) \tag{15}$$

$$V(x,y) = \frac{2}{N}\sqrt{\left[\sum_i I_i \cos(\delta_i)\right]^2 + \left[\sum_i I_i \sin(\delta_i)\right]^2} \tag{16}$$

$$A(x,y) = \frac{1}{N}\sum_{i=1}^{N} I_i - V \tag{17}$$

The reconstructed image generation part 324 identifies an approximation value of each pixel using the modeled parameter for each pixel identified by the modeling part 323. Then, the reconstructed image generation part 324 generates the reconstructed images reconstructed with the identified approximation value of each pixel corresponding to the respective measured images. The reconstructed image generation part 324 gives the generated reconstructed images to the image changing part 325.

The image changing part 325 changes the pixel values of the plurality of measured images based on statistics of the pixel values of the respective measured images and based on statistics of the pixel values of the corresponding reconstructed images. For example, the image changing part 325 subtracts, from the pixel value of each pixel of the respective measured images, a difference between a mean value of the pixel values of the pixels included in the measured images and a mean value of the pixel values of the pixels included in the corresponding reconstructed images. Processing for changing the pixel value of each pixel of the measured images by the image changing part 325 will be described below.

First, the image changing part 325 identifies a mean value of the pixel values of the pixels included in the i-th measured image. Next, the image changing part 325 identifies a mean value of the pixel values of the pixels included in the reconstructed image corresponding to the i-th measured image. Then, the image changing part 325 identifies, as an error $\varepsilon_i$ of the i-th measured image, a difference between the mean value of the pixel values of the pixels included in the i-th measured image and the mean value of the pixel values of the pixels included in the reconstructed image corresponding to the i-th measured image. The error $\varepsilon_i$ is represented by Equation (18).

$$\frac{1}{M}\sum_{x,y}\{I_i(x,y) - I_i^R(x,y)\} = \varepsilon_i \tag{18}$$

In Equation (18), M indicates the total number of pixels included in the measured images, and $I_i^R(x,y)$ indicates the pixel value of pixels of the reconstructed image corresponding to the i-th measured image. It should be noted that the total number of the pixels included in the reconstructed image is equal to the total number of the pixels included in the measured image.

The image changing part 325 changes the pixel value by subtracting the identified error $\varepsilon_i$ from the pixel value $I_i(x,y)$ of each pixel included in the i-th measured image. The changed pixel value is represented by Equation (19).

$$I_i(x,y) - \varepsilon_i = I_i'(x,y) \tag{19}$$

Similarly, the image changing part 325 changes the pixel values of the pixels included in the respective acquired measured images.

The image changing part 325 gives the respective measured images having the changed pixel values to the modeling part 323. The modeling part 323 identifies a phase value included in the modeled parameter for each pixel of the respective measured images having the changed pixel values. The modeling part 323 gives the identified phase value to the image changing part 325.

The image changing part 325 identifies a variation amount of the phase on the basis of (i) a phase value included in the modeled parameter for each pixel of the respective measured images having unchanged pixel values and (ii) a phase value included in the modeled parameter for each pixel of the respective measured images having the changed pixel values. For example, the image changing part 325 identifies, as the variation amount of the phase, a difference between the phase value included in the modeled parameter for each pixel of the respective measured images having unchanged pixel values and the phase value included in the modeled parameter for each pixel of the respective measured images having the changed pixel values.

The image changing part 325 determines whether the variation amount of the phase is equal to or less than the predetermined variation threshold value. Upon determining that the identified variation amount of the phase of pixels is larger than the predetermined variation threshold value for a number of pixels larger than or equal to a predetermined number, the image changing part 325 changes the pixel values of the respective measured images having the changed pixel values. The predetermined amount is, for example, one. Upon determining that the variation amount of the phase is equal to or less than the predetermined variation threshold value, the image changing part 325 determines that the phase value has converged and does not change the pixel values of the respective measured images and gives the measured images having the changed pixel values to the geometry identification part 326. In this way, the image changing part 325 can reduce the variation amount of the phase to be equal to or less than the variation threshold value that is acceptable for the geometry identification part 326 to identify the geometry of the object to be measured, and thus the image changing part 325 can reduce the influence of the surrounding environment on the measured image.

The geometry identification part 326 identifies the geometry of the object to be measured using the plurality of the measured images having the pixel values changed by the image changing part 325. For example, the geometry identification part 326 identifies the geometry of the object to be measured based on the phase value of the modeled parameters for the measured images having the changed pixel values. Specifically, the geometry identification part 326 identifies a phase φ(x,y) associated with the height of the object to be measured by subtracting the phase k(x,y) that corresponds to the projection patterns projected on the object to be measured in Equation (15). As such, since the geometry identification part 326 is capable of identifying the geometry of the object to be measured by using the plurality of measured images in which the influence of the surrounding environment is reduced, the geometry identification part 326 can improve measurement accuracy of the object to be measured.

Figure 6:
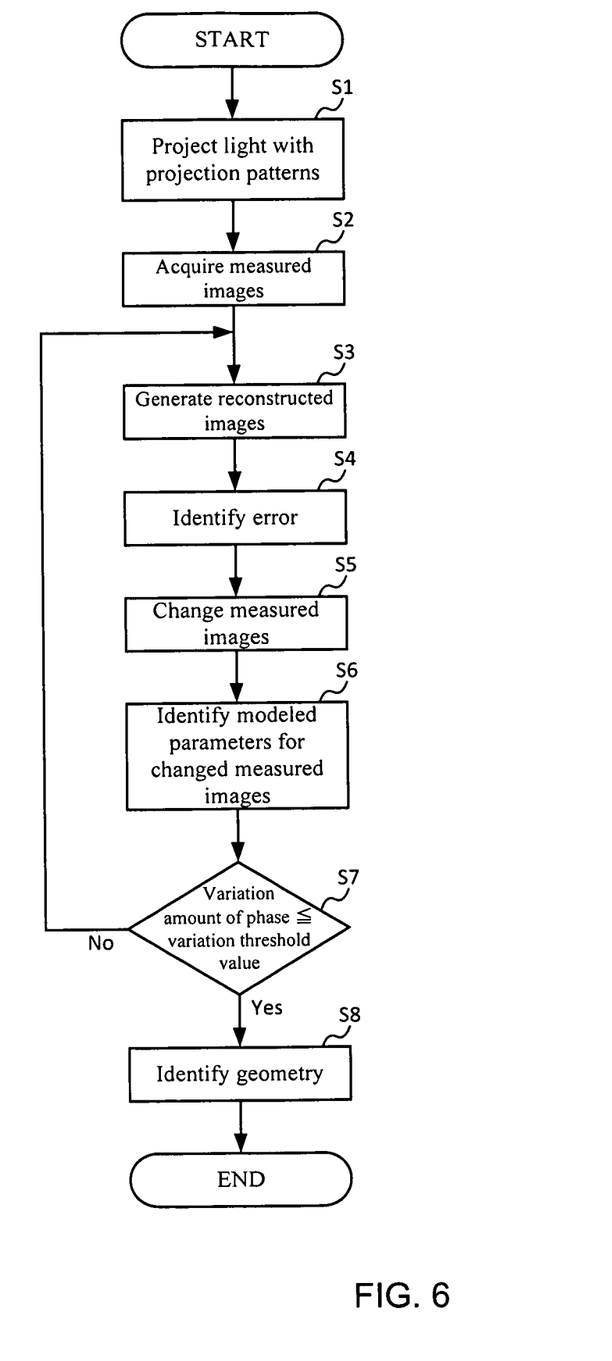
FIG. 6 is a flowchart showing processing for reducing the influence of the surrounding environment on the measured image performed by the image processing apparatus.

Processing for reducing the influence of the surrounding environment on the object to be measured performed by the image processing apparatus 3 will be explained below by referring to FIG. 6. FIG. 6 is a flowchart showing processing for reducing the influence of the surrounding environment on the measured image performed by the image processing apparatus 3. First, the apparatus control part 321 projects light with a plurality of projection patterns by controlling the projection apparatus 1 (step S1). The apparatus control part 321 generates the measured images by controlling the capturing apparatus 2 to capture the object to be measured onto which the light with the plurality of projection patterns is projected. The image acquisition part 322 acquires the measured images generated by the capturing apparatus 2 (step S2).

Subsequently, the modeling part 323 identifies modeled parameters for the acquired measured images. The reconstructed image generation part 324 generates a reconstructed image using the approximation value of each pixel identified based on the identified modeled parameters (step S3). Next, the image changing part 325 identifies, as an error, a difference between (i) a mean value of the pixel values of the pixels included in the measured images and (ii) a mean value of the pixel values of the pixels included in the reconstructed images corresponding to the measured images (step S4).

Then, the image changing part 325 changes the pixel values of the pixels included in the respective measured images based on the identified error (step S5). Subsequently, the modeling part 323 identifies modeled parameters for the measured images having the changed pixel values (step S6). The image changing part 325 determines whether a variation amount of the phase, which is a difference between (i) the phase value of the measured images having unchanged pixel values and (ii) a phase value of the measured images having the changed pixel values, is equal to or less than the variation threshold value (step S7).

If the image changing part 325 determines that the variation amount of the phase is larger than the variation threshold value (No in step S7), the procedure returns to step S3, and the image changing part 325 generates the reconstructed images whose pixel values have been changed by the reconstructed image generation part 324 based on the measured images. If the image changing part 325 determines that the variation amount of the phase is equal to or less than the variation threshold value (Yes in step S7), the geometry identification part 326 identifies the geometry of the object to be measured based on the measured images having the changed pixel values (step S8).

Effects of Embodiments

As described above, the modeling part 323 of the image processing apparatus 3 identifies the modeled parameter of each pixel of the respective measured images, and the reconstructed image generation part 324 generates the reconstructed images based on the modeled parameter. Then, the image changing part 325 changes the pixel value of each pixel of the respective measured images based on the measured images and the reconstructed images corresponding to the respective measured images. In this way, the image changing part 325 reduces the influence caused by fluctuations of the amount of light in the surrounding environment, fluctuations of luminance of the light being projected, or the like, on the measured images.

Also, the image changing part 325 can reduce the influence of the surrounding environment on the plurality of measured images by changing the pixel value of each pixel of the respective measured images a plurality of times. As such, since the geometry identification part 326 can identify the geometry of the object to be measured by using the measured images in which the influence of the surrounding environment is reduced, the geometry identification part 326 can improve measurement accuracy.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

Variation Example 1

In the above explanation, the image processing apparatus 3 has the apparatus control part 321 and controls the projection apparatus 1 and the capturing apparatus 2, but the image processing apparatus 3 does not need to have the apparatus control part 321. For example, the image processing system S may have a system control apparatus in addition to the projection apparatus 1, the capturing apparatus 2, and the image processing apparatus 3, and may generate a measured image by having the system control apparatus control the capturing apparatus 2 and the image processing apparatus 3.

Variation Example 2

In the above explanation, the image processing apparatus 3 acquires the plurality of measured images from the capturing apparatus 2, but methods for acquiring the plurality of measured images are not limited to this. For example, the image processing apparatus 3 may include a communication part and may acquire a plurality of measured images from an external apparatus via the communication part. Specifically, the image processing apparatus 3 is connected to a local area network (LAN) via the communication part and acquires the plurality of measured images from another external apparatus being connected to the LAN.

The image processing apparatus 3 may include an image input part and may acquire a plurality of measured images from a storage medium via the image input part. Specifically, the image input part includes a card interface, a universal serial bus (USB) interface, or the like. The image input part acquires the plurality of measured images from the storage medium connected to an interface. The storage medium is, for example, an SD card or a USB memory.

What is claimed is:

1. An image processing apparatus, comprising:
   an image acquisition part that acquires a plurality of different measured images acquired by capturing an object to be measured onto which light with different projection patterns whose luminance changes according to phases determined by coordinates of a projection image and whose relationships between phase and coordinate are different from each other is sequentially projected;
   a modeling part that identifies, for each pixel, a modeled parameter approximating an approximation function of a data sequence where pixel values of pixels corresponding to respective measured images are placed in an order of the capturing;
   a reconstructed image generation part that generates reconstructed images which are images corresponding to the respective measured images and are reconstructed with approximation values of respective pixels identified based on the modeled parameter of each pixel; and
   an image changing part that changes the pixel values of the measured images based on statistics of the pixel values of the measured images and statistics of the pixel values of the corresponding reconstructed images,
   wherein the image changing part changes pixel values of the measured images by subtracting, from the pixel value of each pixel of the respective measured images, a difference between a mean value of the pixel values of the pixels included in the measured images and a mean value of the pixel values of the pixels included in the corresponding reconstructed images.

2. The image processing apparatus according to claim 1, wherein the modeling part identifies another modeled parameter based on the measured images acquired after pixel values are changed by the image changing part, and
   wherein the reconstructed image generation part updates the reconstructed image if a variation amount of phase, which is a difference between (i) a phase value of previous measured image before the pixel values are changed and (ii) a phase value of new measured images after the pixel values are changed, is more than a variation threshold value.

3. The image processing apparatus according to claim 1, further comprising
   a geometry identification part that identifies a geometry of the object to be measured by using the measured images changed by the image changing part.

4. The image processing apparatus according to claim 1, wherein the image acquisition part acquires the plurality of different measured images to which identifiers identifying the capturing order of the measured images are added.

5. The image processing apparatus according to claim 1, further comprising:
   an apparatus control part that controls a projection apparatus so as to sequentially project the light with the projection patterns onto the object to be measured.

6. The image processing apparatus according to claim 5, wherein the apparatus control part controls the projection apparatus so as to sequentially project the light with the projection patterns having sinusoidal patterns, while changing the phases of the sinusoidal patterns.

7. The image processing apparatus according to claim 1, further comprising a geometry identification part that identifies a geometry of the object to be measured by using the measured images changed by the image changing part,
   wherein the image changing part determines whether variation amounts of the phases corresponding to a number of pixels larger than a predetermined number are equal to or less than a predetermined variation threshold value, and
   wherein the geometry identification part identifies the geometry of the object to be measured when the image changing part determines that the variation amounts of phases corresponding to a number of pixels larger than the predetermined number are equal to or less than the predetermined variation threshold value.

8. An image processing apparatus, comprising:
   an image acquisition part that acquires a plurality of different measured images acquired by capturing an object to be measured onto which light with different projection patterns whose luminance changes according to phases determined by coordinates of a projection image and whose relationships between phase and coordinate are different from each other is sequentially projected;
   a modeling part that identifies, for each pixel, a modeled parameter approximating an approximation function of a data sequence where pixel values of pixels corresponding to the respective measured images are placed in an order of the capturing;
   a reconstructed image generation part that generates reconstructed images which are images corresponding to the respective measured images and are reconstructed with approximation values of respective pixels identified based on the modeled parameter of each pixel; and
   an image changing part that changes the pixel values of the measured images based on statistics of the pixel values of the measured images and statistics of the pixel values of the corresponding reconstructed images, wherein
   the image changing part changes pixel values of the measured images if a variation amounts of phases of pixels, identified on the basis of (i) a phase value included in the modeled parameter for each pixel of the respective measured images having unchanged pixel values and (ii) a phase value included in the modeled parameter for each pixel of the respective measured images having the changed pixel values, are larger than a predetermined threshold value for a number of pixels larger than or equal to a predetermined number.

* * * * *